March 5, 1935.  E. R. BARRETT  1,993,203
THREE-WAY DUMPING BODY
Filed Aug. 22, 1932   11 Sheets-Sheet 1

Inventor
Edward R. Barrett
By Lawrance and
Van Antwerp
Attorneys

March 5, 1935.  E. R. BARRETT  1,993,203
THREE-WAY DUMPING BODY
Filed Aug. 22, 1932   11 Sheets-Sheet 3

March 5, 1935.  E. R. BARRETT  1,993,203
THREE-WAY DUMPING BODY
Filed Aug. 22, 1932  11 Sheets-Sheet 6

March 5, 1935.   E. R. BARRETT   1,993,203
THREE-WAY DUMPING BODY
Filed Aug. 22, 1932   11 Sheets-Sheet 8

Inventor
Edward R. Barrett
By Liverance
and
Van Antwerp
Attorneys

March 5, 1935. E. R. BARRETT 1,993,203
THREE-WAY DUMPING BODY
Filed Aug. 22, 1932 11 Sheets-Sheet 9

March 5, 1935.  E. R. BARRETT  1,993,203
THREE-WAY DUMPING BODY
Filed Aug. 22, 1932    11 Sheets-Sheet 11
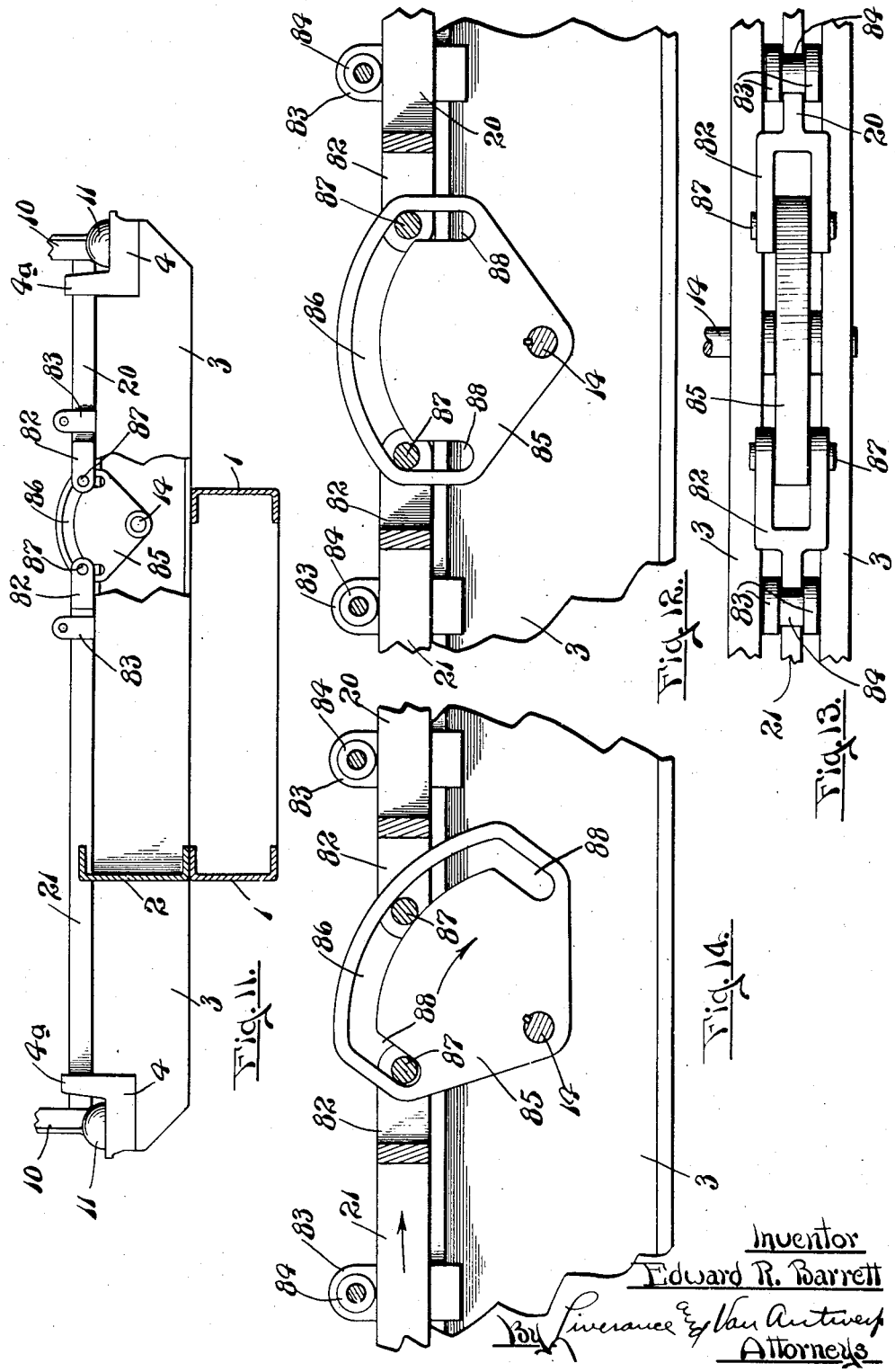

Patented Mar. 5, 1935

1,993,203

UNITED STATES PATENT OFFICE 1,993,203

THREE-WAY DUMPING BODY

Edward R. Barrett, Detroit, Mich., assignor to Wood Hydraulic Hoist & Body Company, Detroit, Mich., a corporation of Michigan Application August 22, 1932, Serial No. 629,812

15 Claims. (Cl. 298—18)

This invention relates to dumping bodies and, more particularly, to bodies carried on truck chassis and having a construction whereby the body may be tilted to either side of the truck or to the rear.

The present invention is concerned with many novel constructions, combinations and arrangements of parts for providing a very durable and practical construction, and one which will stand up under the very severe service and usage to which dumping bodies are subjected.

I have heretofore filed an application in the United States Patent Office Serial No. 404,895, filed November 5th, 1929, and the present invention is directed to a construction in which many improvements over the construction shown in my previously filed application are made with a great simplification particularly of the mechanism which controls the pivoted sides of the body during the side dumping operation and with a simplified and much more durable construction for mounting the body for its three directions of tilting. In addition the invention is further concerned with a novel construction for controlling the movement of the rear end of the body whereby said rear end may be permitted to turn downwardly about a lower horizontal axis to be in the same plane with the bottom of the body during end dumping, or a tail-gate portion of the rear end of said body permitted to swing outwardly about an upper horizontal axis from which the tail-gate portion depends during the end dumping operation.

The invention is concerned with novel constructions and arrangements of parts for effectively attaining the ends stated, as well as many others not at this time enumerated, but which will be apparent upon understanding the invention from the following description, taken in connection with the accompanying drawings, in which, Fig. 1 is a side elevation of a truck chassis equipped with the three-way dumping body and apparatus of my invention.

Fig. 11 is a transverse section, similar to Fig. 4, illustrating a different and preferred form of locking structure for the rear joints.

Fig. 12 is a fragmentary enlarged vertical section showing the connection of the locking bars to the rocking operating member with said member in central position.

Fig. 13 is a plan view thereof and,

Fig. 14 is a view similar to Fig. 12, showing said operating rocking member tilted to one side.

Like reference characters refer to like parts in the different figures of the drawings.

Figure 1:
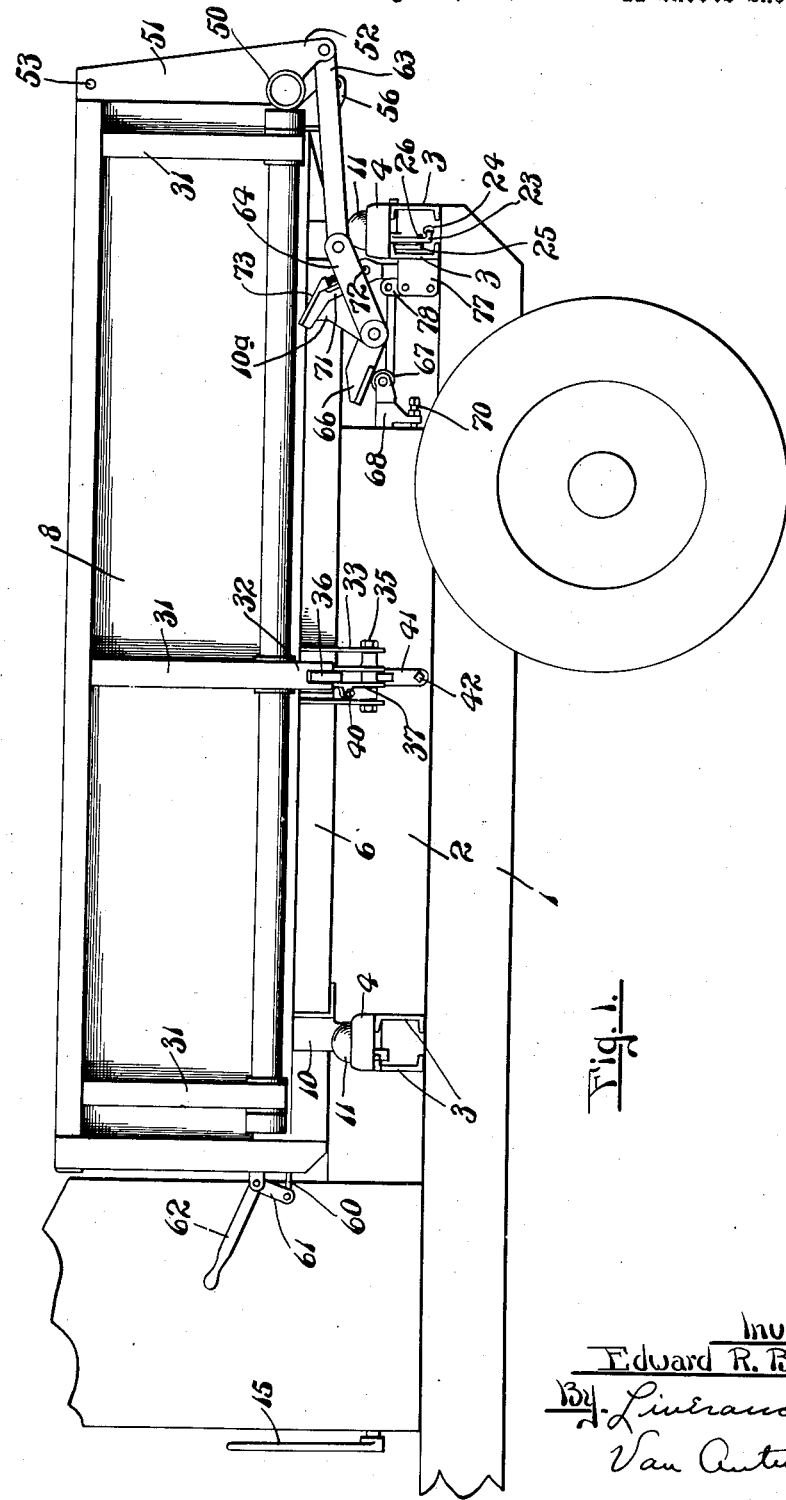

The truck chassis, of any usual or conventional construction, includes side chassis frame members 1 of channel form, above each of which is a horizontal channel sub-frame member 2. Transverse pairs of channels 3 lie above and across the chassis frame members 1 and the flanges of the channels of each pair extend toward each other, being spaced apart short distances as best shown in Fig. 1. At each end of each of the pairs of channels socket members 4 are secured, bridging between the channels of each pair and at their upper sides having concaved recesses in the shape of segments of a sphere so as to be adapted to readily receive spherical members which with the socket members 4 provide the pivot joints about which the body turns either to a side or to the rear.

The body has an under supporting and carrying frame work comprising parallel longitudinal sills 5 spaced apart so as to lie directly above the members 2 previously described and with angle bar sills 6 outwardly of and parallel to the sills 5, together with a plurality of cross sill members 7 (Fig. 2), which sills and cross sills are welded or otherwise permanently secured together to make a strong and durable under frame structure above which the bottom 8 of the body is located and secured. Said bottom 8 is of suitable thin steel or sheet metal. The body has a vertical front end 9 and is completed by pivoted sides and a pivoted rear end which will be later described.

The body, when in its normal horizontal position, is located horizontally above the cross members 3. Directly over each of the sockets 4 vertical brackets 10 are secured to the under frame of the body which at their lower ends terminate in spherical heads 11 adapted to be received in the sockets. It is apparent that the body may be turned to either side or to the rear. When the body is turned to one side, as in Fig. 3, the heads at the right side remain seated in the sockets 4, while the heads 11 and the brackets 10 with which they are integrally joined at the opposite side are lifted with the lifting of the body at such side. When the body is tilted to the rear, as in Figs. 9 and 10, the rear spherical heads or balls 11 remain in the rear sockets 4 and the front ones are lifted; and if the body should be tilted to the left the heads or balls 11 at the left would remain in their respective sockets and those at the right side of the construction be elevated.

A locking control apparatus is provided for releasably locking certain of the balls or spherical heads 11 in their sockets while others are released for elevation on tilting. Between the spherical heads or balls 11 at the front a locking bar 12 is slidably mounted which, at its ends and lower corners, is cut away providing arc-shaped recesses 13. The end portions of these bars may pass through upwardly extending guides 4a at the inner sides of the socket members 4. In the normal position of the front bar each end of the bar is located inwardly a short distance from the adjacent head 11, as in Fig. 2, so that neither of the heads 11 at the front end of the body is locked in its socket 4.

Figure 2:
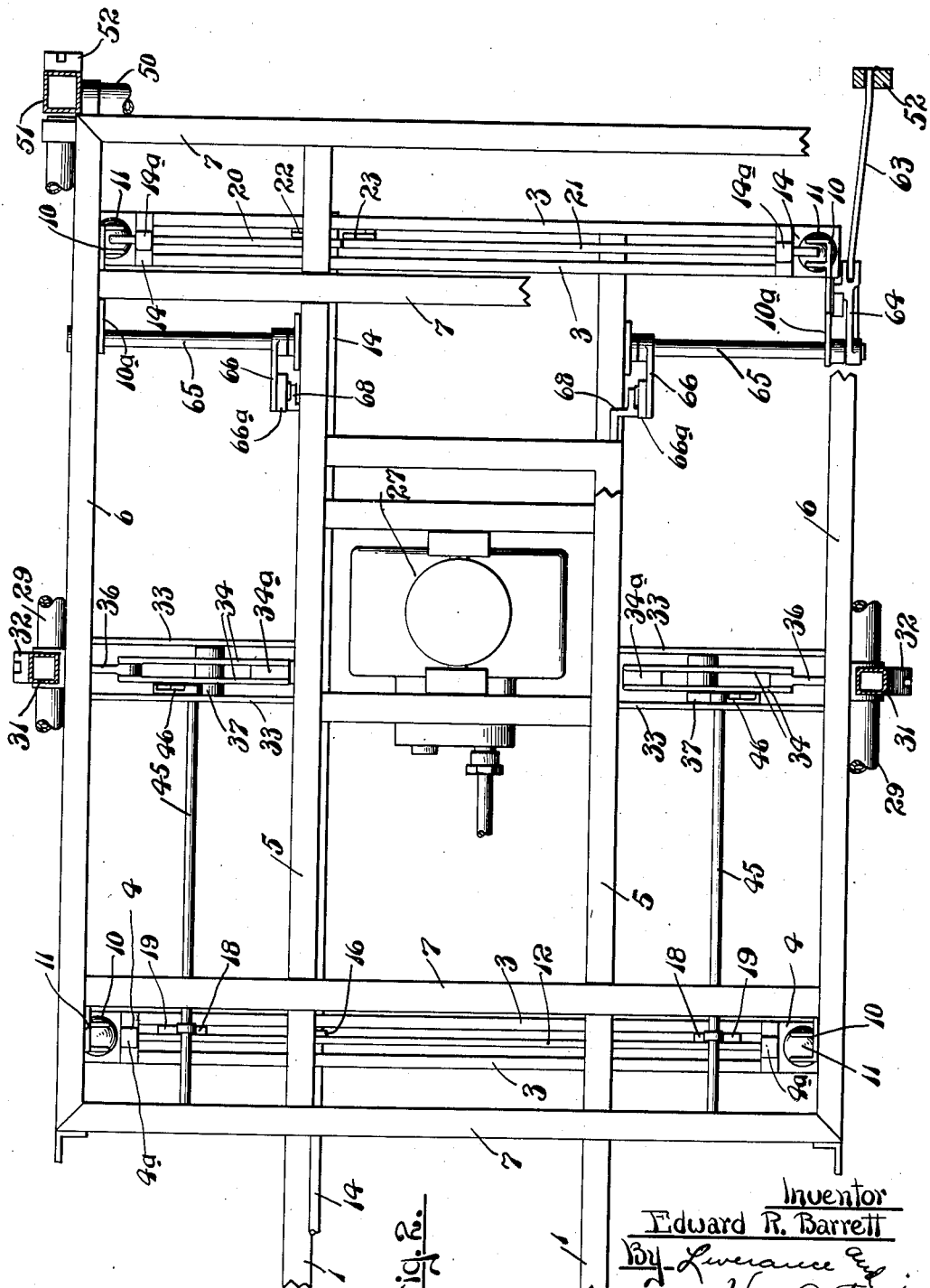
Fig. 2 is a plan view of the apparatus with the body removed and showing in plan the various controls therefor.
Figure 3:
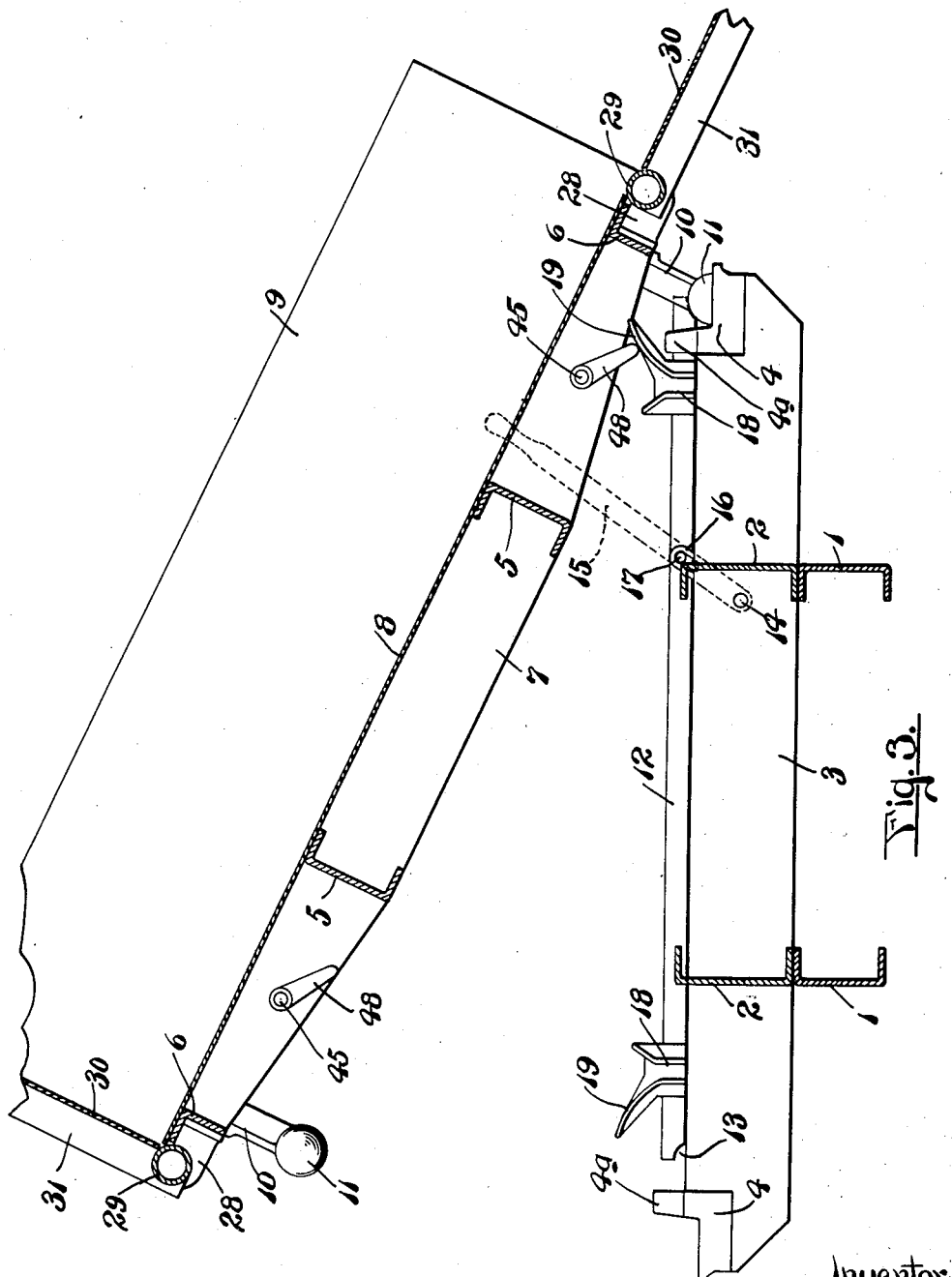
Fig. 3 is a fragmentary transverse section through the body and truck frame toward the front end thereof and showing the body tilted to one side.
Figure 4:
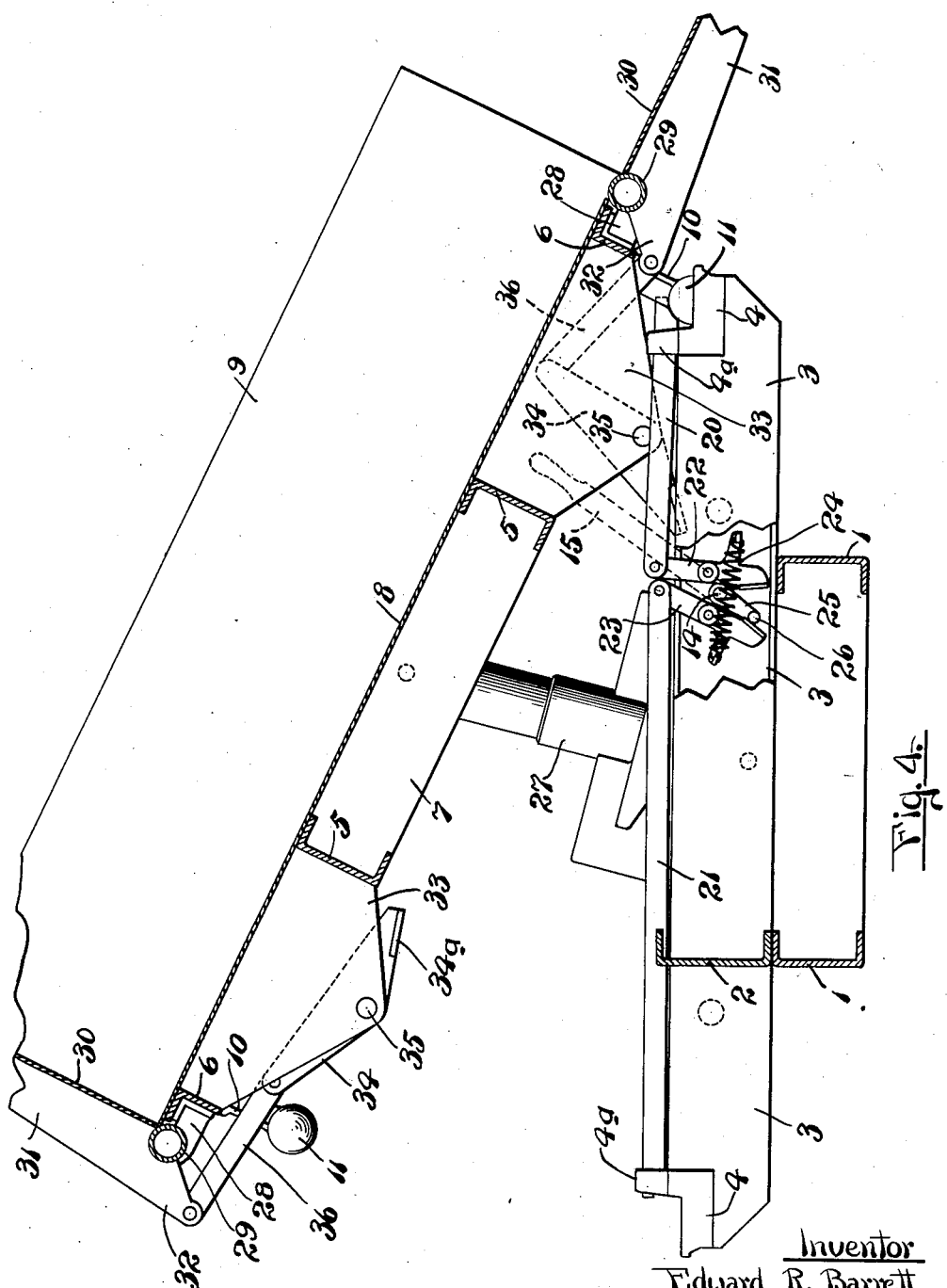
Fig. 4 is a similar transverse view toward the rear end of the construction, with the body similarly tilted, Fig. 3 showing the locking apparatus for the front joints of the body and Fig. 4 that for the rear joints.

A rock shaft 14 extends lengthwise of the body and in a plane below the bar 12 (Figs. 2, 3 and 4). The front end of the rock shaft 14 reaches to the cab of the truck and a handle 15 is secured thereto in a position such as to be readily reached by the driver of the truck. The handle, in normal position, is located vertically but may be rocked to either side of such normal vertical position. An arm 16 is secured to the rock shaft and extends upwardly alongside the bar 12 (Figs. 2, 5 and 6) and is longitudinally slotted at its upper end portion. A pin 17 extends from the bar 12 into said slot.

It is evident that on moving the operating handle 15 from its vertical position to the right, as in Fig. 3, in correspondence with the dotted line position indicated, the arm 16 will be correspondingly moved and the right hand end of the bar 12 brought so as to engage against and above the upper side of the front head 11 at the right hand side of the truck, thereby locking this joint at the front right hand side of the construction; and if the handle 15 is moved to the left from its normal vertical position the bar 12 is moved correspondingly to the left and the ball 11 at the left hand side is locked in its socket 4 while the one at the right remains free.

On the locking bar 12 adjacent each end thereof is a guide fixture 18 which has spaced apart vertical guides, the outer one of which in each, at its upper portion, is curved upwardly and outwardly as indicated at 19. These guide members, being fastened to the bar 12, move with it in the longitudinal movements imparted thereto by swinging the handle 15 either to the right or to the left. The purpose of such members will hereafter be described.

For the rear spherical heads 11 a different construction of locking arrangement is provided, as shown in Fig. 4. Two locking bars 20 and 21 are used and each at its outer end is recessed at its lower corner like the arc-shaped recess 13 in each end of the front bar 12. The two bars 20 and 21, at their adjacent inner ends, are pivotally connected to the upper ends of two levers 22 and 23, respectively, each of which is pivotally mounted between its ends; and the two levers are connected by a coiled spring 24 secured at its ends to lateral projections located below the pivots of said levers, as shown in Fig. 4, the tendency of the spring being to draw the lower ends of the two levers together and thereby move both bars 20 and 21 outwardly, so that the outer ends of said bars reach to and engage over the upper sides of the rear spherical joint members 11.

The lengths of the bars 20 and 21 are such that the location is one at each side of the rock shaft 14 previously described. An arm 25 extends downwardly from the rock shaft and terminates at its lower free end in a horizontal portion 26 which passes between the lower ends of the levers 22 and 23 as clearly shown in Fig. 4.

The normal position of the rear locking bars 20 and 21, with the operating handle 15 in its normal vertical position, is such as to lock both of the rear joints. On turning the handle to the right, as indicated in dotted lines in Fig. 4, the bar 20 is not moved so that the rear joint at the right remains locked but the clockwise movement of the part 26 of arm 25 swings the lever 23 from its normal vertical position, thereby drawing the locking bar 21 inwardly and releasing the spherical ball 11 at the rear left corner. It is, accordingly, apparent that on swinging the handle 15 to the right as indicated in dotted lines in Figs. 3 and 4, both of the joints at the left hand side of the truck are free to separate, the joint at the front at the right hand side is locked, and the joint at the rear at the right hand side remains locked as it was before any movement of the handle 15 and the rock shaft 14 takes place. It accordingly locks both of the joints at the right side against disengagement and releases both at the left side for separation so that the body may be tilted upwardly to dump to the right side.

If, on the contrary, the handle 15 is turned to the left from its normal vertical position, lever 22 is the one then acted upon by the arm 25, releasing the rear joint at the right side and not disturbing the locked rear joint at the left. Both joints at the right are then unlocked for separation and both at the left are in locked position for tilting to the left side of the truck.

The power for tilting the body may be supplied by any suitable means, and I have indicated in Fig. 4 a telescoping hydraulic hoist for this purpose at 27. The detail of the hoist used is no part of the present invention.

The extension of the hoist upwardly tilts the body about the joints which are in locked position. If the handle 15 is left in its central vertical position then both rear joints are locked and both front joints unlocked and the body is lifted at its front end for rear dumping. When the handle is turned to the right both joints at the right side are locked and both at the left are unlocked. The tilting under such conditions will be to the right of the truck. Turning the handle 15 to the left from its normal vertical position insures unlocking both joints at the right hand side and locking both at the left and the tilting will be for dumping the body contents to the left side of the truck.

In side dumping it is necessary that the sides of the body, which together with the front 9 and the rear end of the body hold the load therein, be turned so as to permit escape of the load when the body is tilted. At each side of the lower part of the body are supporting brackets 28 connected to the lower longitudinal frame bars 6 which carry a rotatable shaft 29 one at each end of the body. The vertical sides 30 of the body are of rolled or sheet metal and are fastened to a plurality of vertical arms 31 which in turn are mounted on a shaft 29 so that each side 30 of the body may be turned downwardly to lie in the same inclined plane as the bottom 8 when the body is tilted.

The middle arm 31 at each side of the body has a lower extension 32 below the axis of its associated shaft 29. Supporting plates 33 in spaced parallel relation are secured to and between the interior longitudinal sills 5 and the outer longitudinal sills 6 of the under frame of the body between which a lever 34 is pivotally mounted on a pivot rod 35 extending through said supporting plates. This construction is duplicated at each side of the body and a description of one will suffice for both. The inner end of the lever 34 has a connecting piece 34a between the two spaced apart sides of the lever 34 as shown in Fig. 2. A link 36 connects the outer ends of the sides 34 of the lever with the lower end of the arm 32 previously described.

Alongside the lever 34 and mounted upon the pivoted rod 35 is a latching dog 37 which has a short arc-shaped slot 38 cut therethrough, a pin 39 from the lever 34 passing through said slot. This permits a limited range of adjustment which is controlled by adjusting screw 40 mounted on the lever 34 and engaging against the latching dog 37 near its free end.

A controlling member for each side 30 is provided in the form of a bracket or abutting means 41 carrying a roller 42 at its outer free portion, said bracket being pivoted at 43 to the adjacent under frame member 2 (Fig. 7) and which may be adjusted by an adjusting screw 44 threaded through the lower part of the bracket to bear against the sub-frame member 2. The part 34a of the lever 34 bears against the roller 42 as shown.

A rock shaft 45 is located at each side and below the body under frame and rotatably mounted on cross members 7 thereof and in one of the plates 33, as shown in Fig. 2, from which a sector-like arm 46 extends having a curved bearing flange 47 at its outer free end. The arm 46 is located in the same vertical plane with the latching dog 37 and is adapted, as shown in Fig. 5, to be interposed against the free end of said latching dog when the body is in lower portion and the bar 12 is at its normal position, that is, with neither end thereof engaging against a spherical head 11 of the joints at the front end and with the operating handle 15 and the arm 16 in vertical position.

From the rock shafts 45 near their front ends arms 48 connected thereto extend downwardly and are provided with horizontal parts 49 at their lower ends to enter between the vertical guide portions of the guides 18 previously described as permanently connected to the bar 12.

Figure 5:
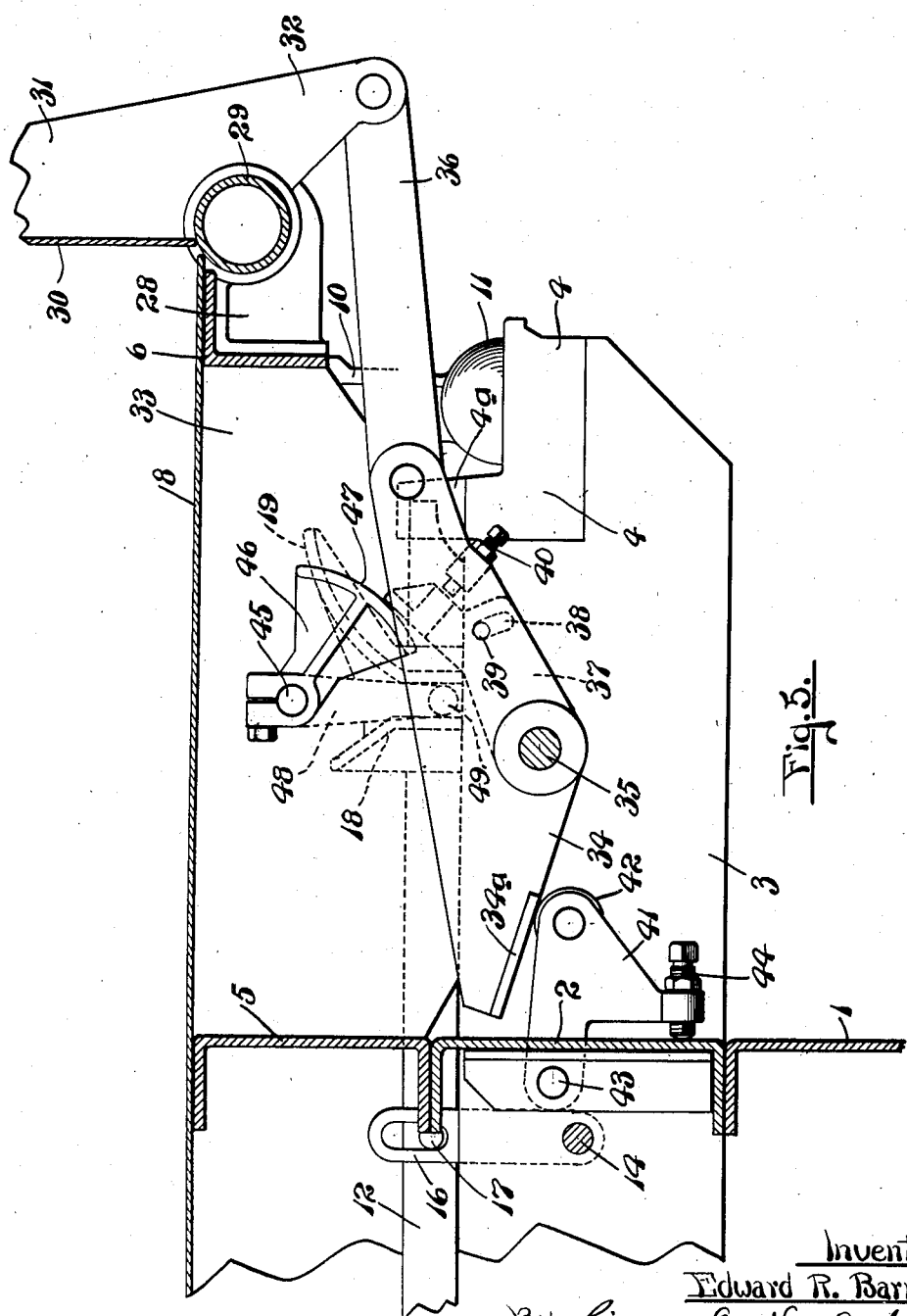
Fig. 5 is a fragmentary vertical transverse section taken substantially midway between the ends of the body, and with the body in its horizontal position and illustrating the control means for side dumping operations of the body.
Figure 6:
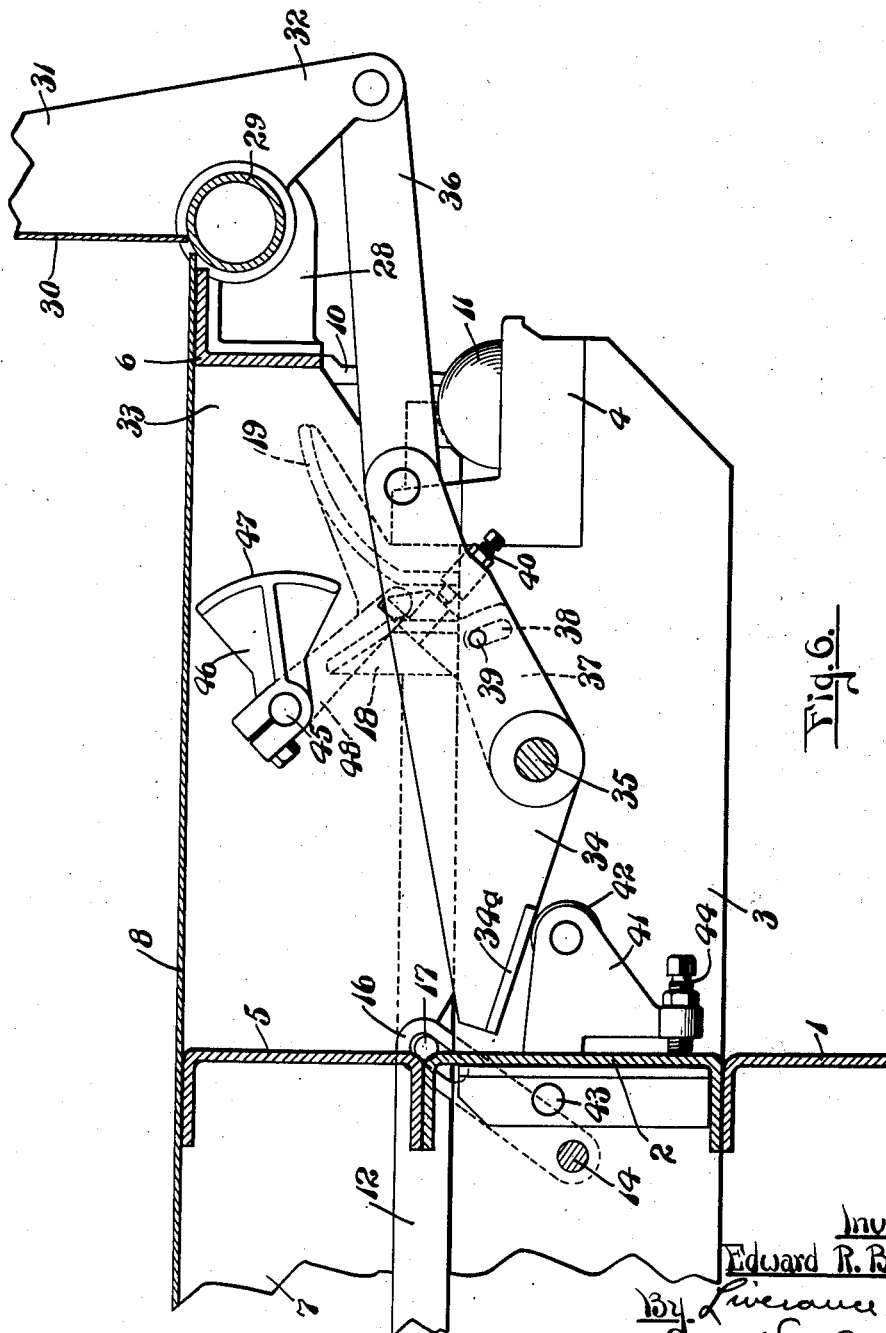
Fig. 6 is a view similar to Fig. 5 showing the control means operated to release an adjacent side of the body for automatically turning to a down position with the tilting of the body toward said side.

It is apparent therefore that on rocking the shaft 14 to make a longitudinal movement of the bar 12 from the position shown in Fig. 5 to that shown in Fig. 6, the movement of the guide 18 with which the lower end of the arm 48 is connected at the right side of the machine rocks the shaft 45 and turns the latching dog engaging sector 47 of the arm 46 to disengaged position, as shown in Fig. 6; while as previously described, the front joint at the right hand side of the machine has its parts 11 and 4 locked against separation. The other rock shaft 45 is likewise rocked but in a direction counter to the shaft 45 at the right hand side of the machine so that no disengagement of the contacting sector 47 of arm 46 with its associated latching dog 37 occurs.

Figure 7:
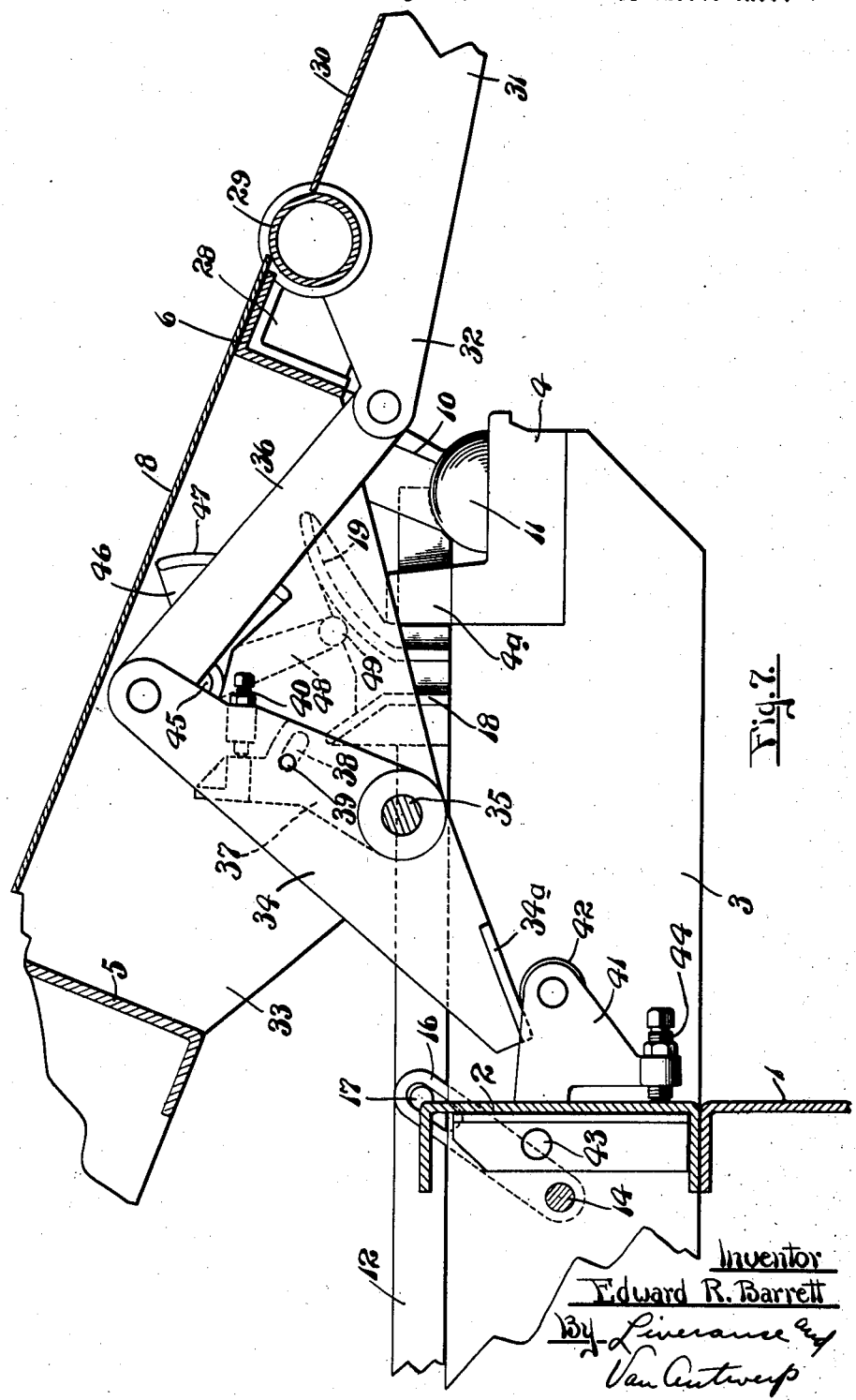
Fig. 7 is a view similar to Figs. 5 and 6 illustrating the position of the parts after the body has been tilted to one side.

On extending the hoist 27, with the parts in the position shown in Fig. 6, there is a tilting movement of the body as shown in Fig. 7. With such tilting movement, as the latching dog 37, carried by the lever 34, is freed from its keeper 47 thus permitting the side 30 at the right hand side of the truck to swing outwardly about the axis of the shaft 29 to which it is connected, with a clockwise turning movement of the lower arm 32 of the bar 31, thereby moving the link 36 longitudinally and turning the lever 34 in a counterclockwise direction as fast as permitted by its engagement against the roller 42. The released side 30 accordingly turns down to a position in the same inclined plane with the bottom 8 of the body and the load carried in the body slides by gravity therefrom over the bottom 8 and over the outwardly extending side 30 in the position which it occupies as shown in Fig. 7.

On telescoping and lowering the hoist 27 the body returns to its normal position by gravity. The end of the lever 34, bearing upon the roller 42, is compelled to return to normal position, pushing upon the link 36 and thereby turning the side 30 to vertical position. After the body has returned to its horizontal position above the truck chassis, handle 15 is operated to vertical position whereupon the arm 48, engaged by the upwardly and outwardly curved section 19 of its associated guide member rocks the shaft 45 and turns the locking member 46 into a position to engage with the latching dog 37, as in Fig. 5, thereby securely holding the side of the truck in vertical body completing position.

The operation for the side dumping to the other side of the truck is the same and the action of the parts is the same except that the lever 15 is swung to the left instead of to the right, thereby releasing the latch for the left side of the body instead of at the right side, and, of course, as previously described, locking the joints about which the body turns at the left side and releasing them at the right.

It is apparent that selection of the side to which the load in the body shall be dumped is secured by merely swinging the operating handle 15 either to one side or the other from its normal vertical position. If the handle 14 is not moved at all there will be rear dumping. If moved to the right there will be dumping to the side at the right of the truck and if moved to the left dumping to the side at the left of the truck. The proper locking of the selected joints and unlocking of others at the different sides of the truck and the proper unlatching of one side to automatically turn downward while the other remains latched are all accomplished by the simple movement of the handle 15.

Figure 8:
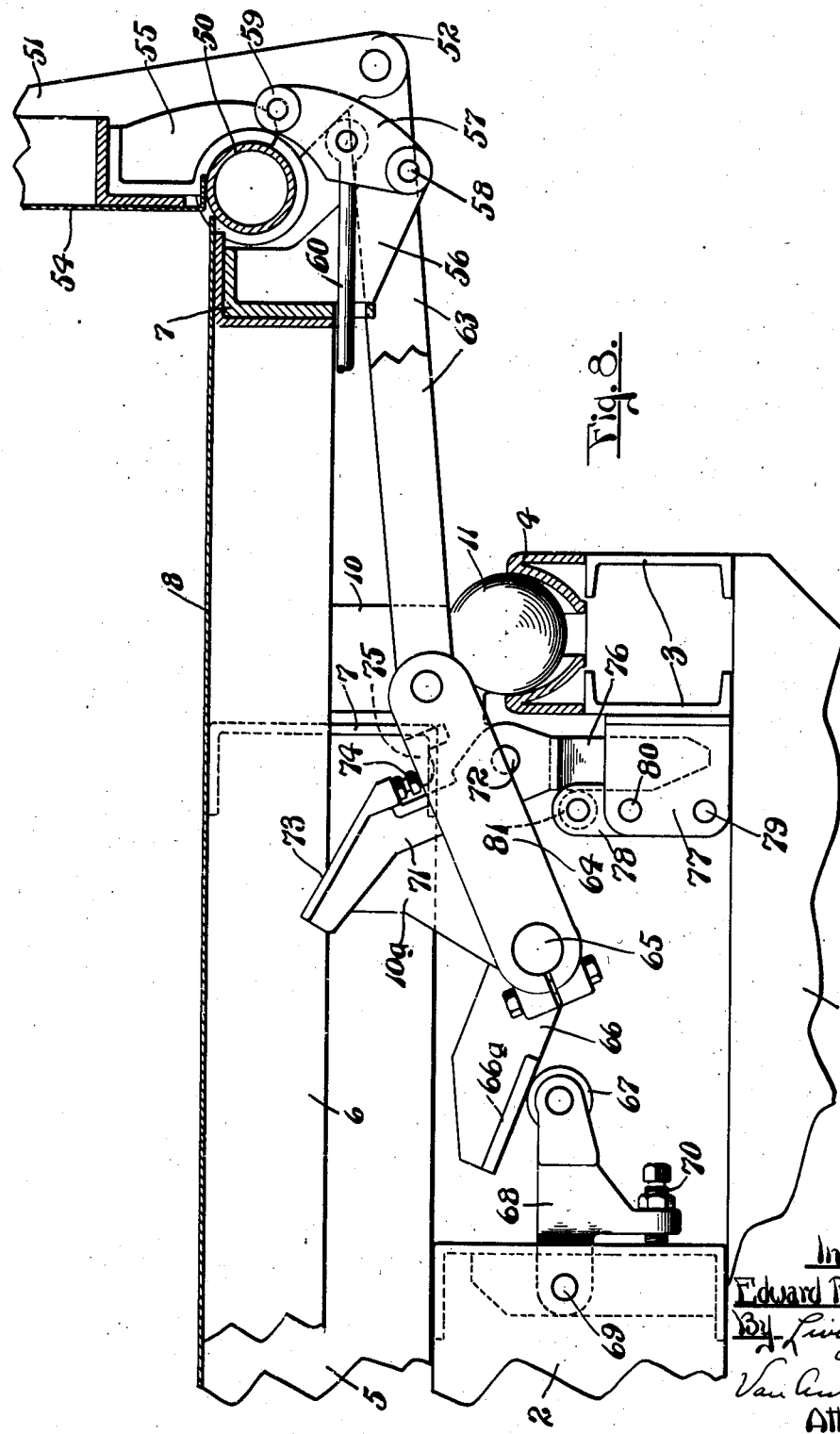
Fig. 8 is a fragmentary longitudinal section of the rear portion of the body with the control means for the rear end thereof, the body being in horizontal position.
Figure 9:
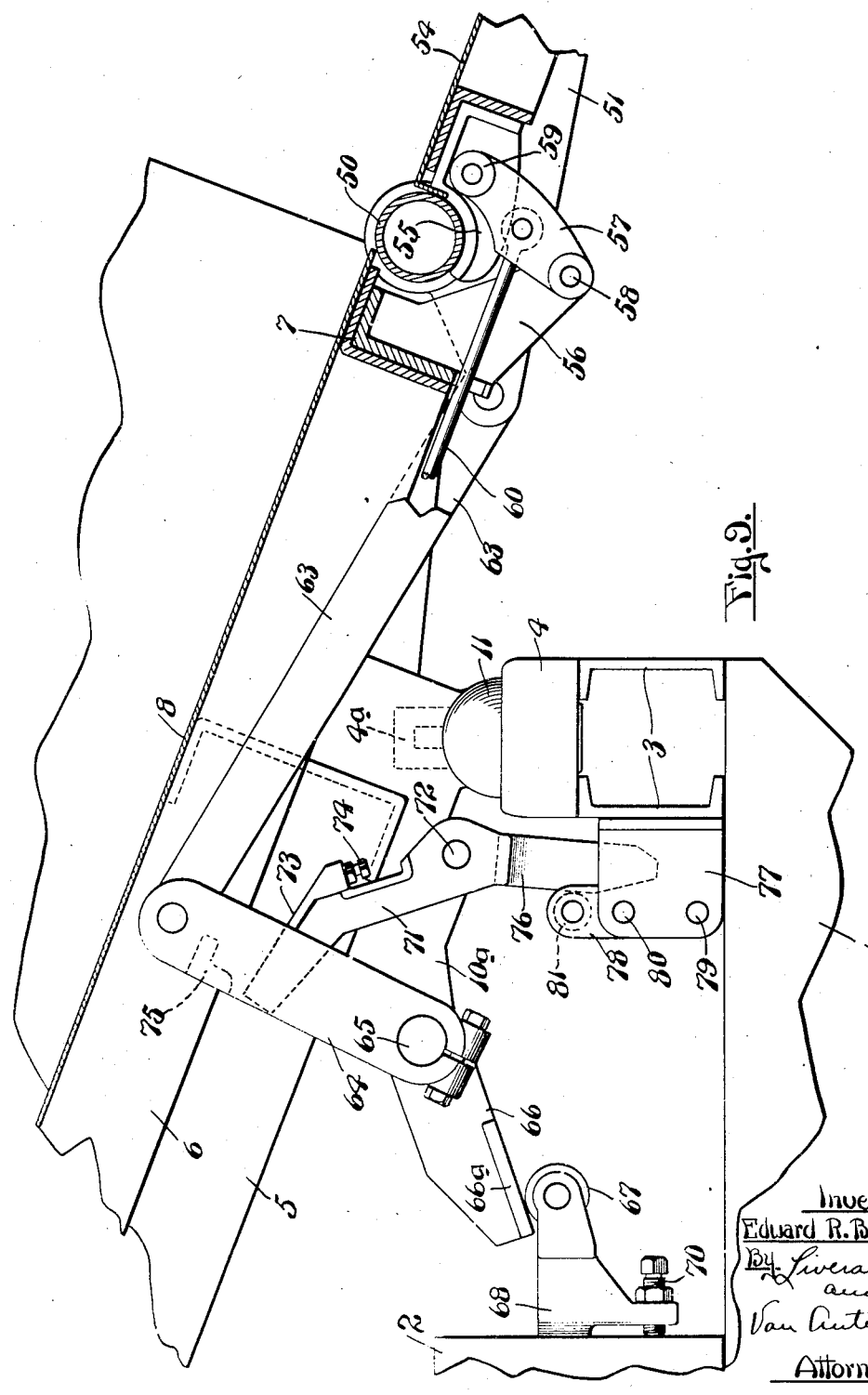
Fig. 9 is a like view showing the body tilted for rear end dumping and with the rear end of the body turned downwardly to be in the same inclined plane with the bottom of said body.
Figure 10:
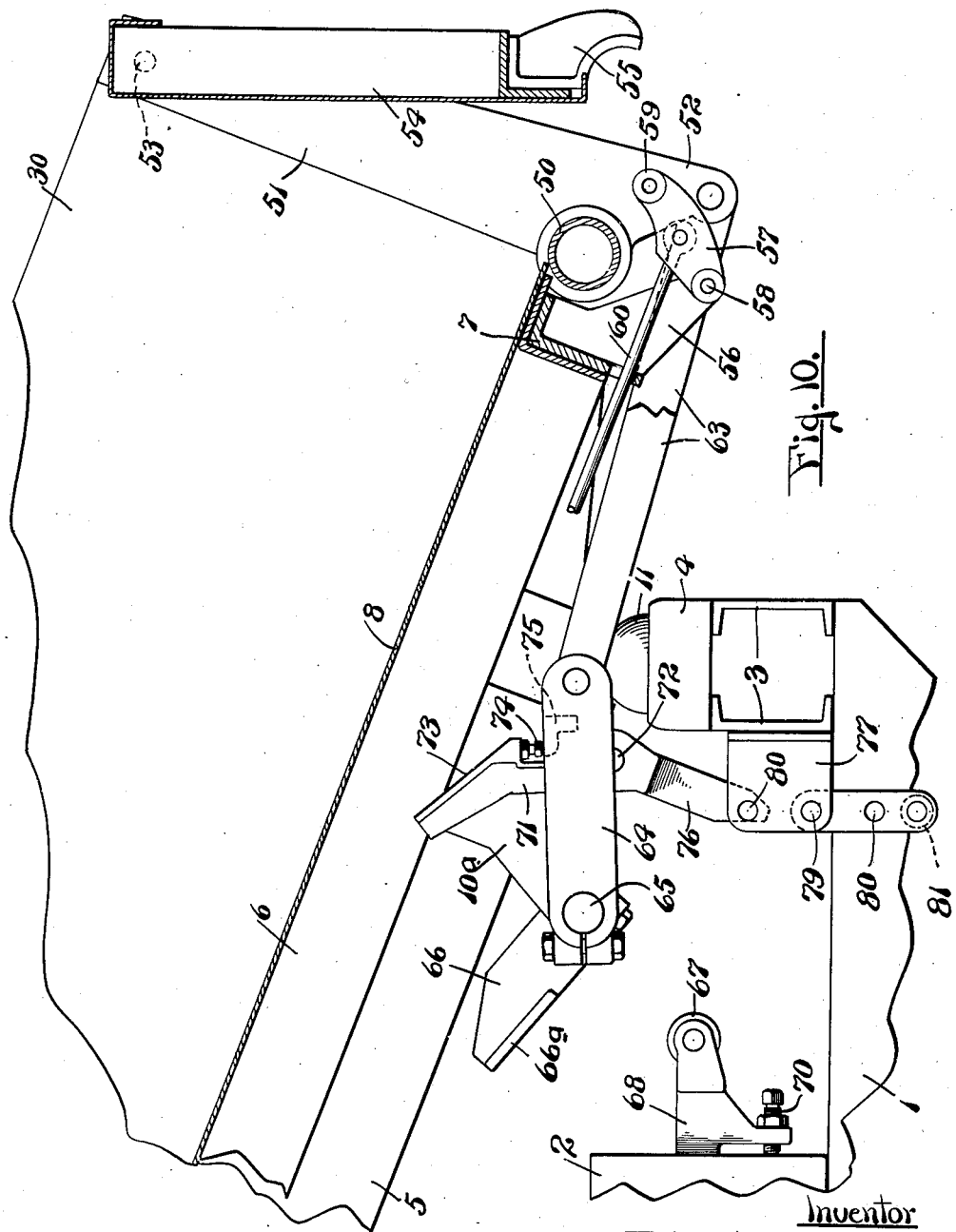
Fig. 10 is a view similar to Figs. 8 and 9 wherein the tail-gate portion of the rear end of the body is released to swing outwardly about an upper horizontal axis when the body is tilted.

In the construction, at the rear end and lower side of the body a transverse horizontal shaft 50 is mounted on or with which vertical posts 51 are mounted for turning movement to be either in a vertical position, as shown in Fig. 10, or to be turned down to a lower position, as in Fig. 9. The lower ends of the posts 51 extend downwardly below the axis of the shaft 50 as indicated at 52. A horizontal rod 53 extends between the upper ends of the posts 51 on which a tail-gate 54 is pivotally suspended. Of course the pivotal suspension of the tail-gate 54 from and between the upper ends of the posts 51 may be provided in any other suitable manner. At the lower end of the tail-gate a finger 55 is provided which, in the closed position of the tail-gate, (Fig. 8) bears against the shaft 50.

A bracket 56 is secured to the rear transverse horizontal underframe member 7 of the body and extends downwardly and to the rear and has a latch 57 pivotally mounted thereon at 58, carrying a roller 59 at its upper end which bears against the outer side of the finger 55 (Fig. 8) serving to hold the tail-gate in closed position when such bearing engagement takes place. A rod 60 is connected at its rear end to the latch 57 at a point between its ends and extends forward to adjacent the cab of the truck. At its front end it is pivotally connected to one arm 61 of a pivotally mounted bell-crank, the other arm 62 of which is a handle to be engaged by the operator for turning the bell-crank and imparting longitudinal movement to the rod 60. On pushing downwardly on the handle 62 the latch 57 may be turned rearwardly about its pivot 58 to release the tail-gate permitting the same to swing outwardly when the body is tilted. This is shown in Fig. 10.

At each side the lower portion 52 of each post 51 has a link 63 pivotally connected therewith which extends forwardly and at its front end is pivotally connected to a bar 64 at one end thereof. The other end of the bar is secured to a rock shaft 65 mounted for rotation on a forward extension 10a of the adjacent bracket 10 of each rear corner joint member. Each shaft 65 extends inwardly to one of the sill members 5 previously described and is mounted at its inner end in conjunction with said sill member. An arm 66 is connected to the inner end portion of each rock shaft 65 and has an engaging portion 66a to ride against a roller 67 on a bracket 68 which is pivotally mounted at the rear end of each of the sub-frame members 2, in the same manner that the brackets 41, previously described, are pivotally mounted on the sides of said frame members 2; and the bracket 68 is similarly adjusted by screw 70 (Fig. 9).

An irregularly shaped latch member 71 is pivotally mounted between its ends at 72 on each of the parts 10a and the portion thereof above the pivot, at its upper end, has an inclined face 73 as shown and also carries an adjustable stop 74 which, in the horizontal position of the body (Fig. 8), rides upon a lug 75 extending laterally from the bar 64. Below the pivot 72 the member 71 consists of a vertical post 76 adapted to be received in a guide 77 located one above each chassis frame member 1 and in front of the rear cross channel members 3. The guide 77 may consist of spaced apart sides together with a bar 78 adapted to be located between the sides and pivotally mounted at its lower end, at 79, thereon. Said bar may be retained in a vertical position in the guide by means of a pin 80 passing through alined openings in the plates and bar. At its upper end the bar carries a roller 81 against which the front side of the post portion 76 of the member 71 may bear, as shown in Figs. 8 and 9.

With the body in horizontal position and with the tail-gate closed and latched the parts are in the position shown at Fig. 8. Upon elevation of the front end of the body for rear dumping, with the latch 57 remaining in the position shown in Fig. 8, the entire rear end structure, comprising the tail-gate 54 and the posts, 51 turns downwardly to the rear, as shown in Fig. 9, the roller 59 of latch 57 riding over the curved outer bearing surface of the finger 55 provided therefor and holding the tail-gate from dropping downwardly. The rear end structure both by gravity and the pressure of the load against it tends to turn downwardly, moving the link 63 longitudinally and turning the bar 64 in a counterclockwise direction as fast as permitted, this being governed by the engagement of the arm 66 with the roller 67. The downturning movement of the rear end of the body does not take place simultaneously with the beginning of the upward tilting movement of the body as such movement cannot take place until the head of the adjustable stop 74 has disengaged from the lug 75. This occurs when, upon the upward and rearward movement of the member 71 the same is held from turning at its upper portion to the rear by the engagement of the lower end part 76 thereof against the roller 81, requiring the stop 74 to travel vertically and therefore, relative to the pivot at 72, move in a counterclockwise direction while, at the same time, the lug 75 is moved away therefrom in a clockwise direction. This in a short time effects the release of bar 64 from latching engagement with the member 71, whereupon the rear end of the body turns downwardly and parts take the positions as shown in Fig. 9.

On return of the body to horizontal position, the bearing of the arm 66 against the roller 67 causes a rocking of shaft 65 and a clockwise movement of the member 64 with a consequent turning of the rear end of the body to closed position; and the lug 75, engaging against the upper inclined surface at 73, automatically swings latching member 71 to permit the lug 75 to again come underneath the stop at 74.

For end dumping in which the posts 51 remain vertical and the tail-gate 54 is released at its lower end, latch 57 is turned to the rear as previously described, and furthermore the pin at 80 must be withdrawn for the bar 78 to turn about its pivot 79 downwardly and depend therefrom as in Fig. 10. With such an arrangement of the parts the lug 75 does not disengage from the bolt 74 but the entire mechanism is carried upwardly and to the rear as shown in Fig. 10, the posts 51 remaining held and locked against turning movement. Thus the lower end of the tail-gate 54 is freed and it may automatically swing outward for discharge of the load. The rear end construction permits the utilization of the tail-gate 54 to swing outwardly as shown in Fig. 10, which is many times desirable in spreading the contents of a load over an area while the truck is in movement. By swinging the entire rear end structure of the body downwardly as in Fig. 9 the inner side of the tail-gate is located in the same inclined plane with the bottom 8 of the truck body and the load contents may be discharged farther from the body. This is many times desirable.

In Figs. 11 to 14, inclusive, a somewhat modified, and for reasons of positiveness in action, preferred form of operating means for the rear locking bars 20 and 21 is shown. Said locking bars at their adjacent ends are provided with forks 82. The bars are slidably guided through the upwardly extending parts 4a of the socket members 4 and between upwardly extending fingers 83 connected to cross sills 3 and underneath rollers 84 mounted on and between the upper ends of the fingers 83. At the rear end of the rock shaft 14 an operating plate 85 is secured having an arc shaped slot 86 at its upper portion, the center of curvature of which is coincident with the axis of the shaft 14. Pins 87 pass through the ends of the forks 82 into said slot 86 which at its ends has downwardly extending branches 88 as shown.

This provides a positive connection between the rock shaft and the locking bars 20 and 21. On rocking the member 85 to the right, as shown in Fig. 14, the bar 20 remains without movement, pin 87 on its fork 82 traversing the slot 86 but the bar 21, with its pin 87 in the branch slot 88 at the left is pulled against so as to disengage the outer end of the bar 21 from its associated ball member 11; and similarly on rocking in the opposite direction the bar 21 will be disconnected from its associated ball 11.

On returning the operating member 85 to central position both bars 20 and 21 will be positively positioned in their outer locations engaging at their outer ends with the balls 11 of the rear socket members so that there is a positive insurance that the rear joints will be in locked position.

This construction is preferred to that shown in Fig. 4 inasmuch as the force operating the bars 20 and 21 in Fig. 4 is a yielding spring force which is not as positive as the construction last described. For example if there is any clogging of movement of the bars 20 and 21, by reason of dirt, mud or the like, the spring construction shown may not have strength enough to overcome such clogging and it will not be known that proper locking has taken place. But with the positive construction described, illustrated in Figs. 11 to 14, in order for the operating handle 15 to be at its central neutral position it must necessarily follow that the rear joints have been positively locked. In addition to the positiveness in action the construction is also of a simpler and more durable form and has the advantages inherent in simplicity of structure.

The constructions described are particularly practical and durable and able to withstand very severe usage and heavy strains which apparatus of this character receives in service. The ball and socket separable joints, with the provision for locking selected joints against separation while others remain free or are freed for separation, together with the simplicity of the operating lever or handle 15 in its movements make the construction particularly practical and useful, requiring that the operator of the truck do only the simplest of operating movements and making the construction completely fool-proof.

The rear end construction may be selectively arranged to swing the tail-gate automatically to the rear as in Fig. 10 or the entire rear end construction downwardly as in Fig. 9. Such construction is likewise strong and durable and does not have any parts which are liable to become disarranged or displaced with a resulting breaking of the same in the lifting or return of the body to its horizontal position. The invention is defined in the appended claims and is to be considered comprehensive of all forms of structure coming within their scope.

I claim:

1. In a construction of the class described, a truck chassis, a body located above the chassis, four seat members having concaved recesses in their upper sides carried by the chassis, brackets secured to the underside of and depending from the body having heads shaped to be received in said recesses, a locking bar slidably mounted on the chassis between two of the heads at the front of the body, two locking bars located in alinement on the chassis and slidable thereon between the remaining heads on said body at the rear thereof, said rear locking bars normally at their outer ends engaging one with each head, a rock shaft extending longitudinally of the chassis, means for rocking the same in either direction, connections between the rock shaft and the front bar for moving said bar longitudinally in the direction that the shaft is rocked, and means interposed between the rock shaft and both of said rear locking bars for moving one of said locking bars inwardly without moving the other of said rear locking bars, the other of said rear locking bars being moved inwardly without moving the first mentioned rear locking bar, on rocking the shaft in the opposite direction.

2. In a construction of the class described, a truck chassis, a body located above the chassis, four seat members located two at each side of said chassis, in spaced apart relation, said seat members having concaved recesses at their upper sides, brackets secured to the body and depending therefrom, one for each seat member and positioned thereabove, heads at the lower ends of the brackets shaped to seat in said recess of the seat members, a longitudinal locking bar slidably mounted on the chassis between the two front heads and in normal central position extending at each end within a short distance of said heads, a rock shaft mounted on the chassis lengthwise thereof, a handle at the front end for rocking the shaft in either direction, an arm secured to the rock shaft, connections between said arm and the locking bar for moving the locking bar longitudinally in either direction corresponding to the direction of movement given to said shaft, two rear locking bars slidably mounted on the chassis in alinement with each other, two levers pivotally mounted along side each other on the chassis and connected one at its upper end to the inner end of each of the rear locking bars, spring means connecting said levers and drawing the same together at their lower ends thereby moving the rear locking bars outwardly to engage at their outer ends with said heads, and an arm secured to the rock shaft extending downwardly therefrom and between the lower ends of said levers, for the purposes specified.

3. In a construction of the class described, a truck chassis, a body located above the chassis, four seat members carried by the chassis, each having a concaved recess in its upper side, two at each side thereof with two at the front end of the body and two adjacent the rear end of the body, brackets depending from the body at the corners thereof, spherical heads at the lower ends of said brackets received in the recess of said seat members, a locking bar located between the front heads, guides connected with said seat members through which the end portions of said locking bar pass, said locking bar at its ends and lower sides being recessed to engage against the upper surfaces of said spherical heads, said bar being of a length shorter than the distance between said heads, two rear locking bars located in alinement between the rear spherical heads and likewise recessed at their outer ends and lower sides to engage against the heads, guides on the seat members for said locking bars, spring means normally moving said locking bars outwardly to engage with said heads, and manually operable means connected with said front locking bar and associated with the rear locking bars for moving the front bar longitudinally in either direction and for simultaneously moving one of the rear locking bars inwardly without moving the other of said rear locking bars, for the purposes described.

4. In a construction of the class described, a truck frame, a body mounted on and above the truck frame for tilting movement to a side thereof about a horizontal axis located adjacent said side of the truck frame, a vertical side on said body pivotally mounted thereon at its lower edge lengthwise of the body, a vertical arm connected to said side having a part at its lower end extending below the pivotal axis of the side, a link pivotally connected to the lower end of the arm, a lever pivotally mounted between its ends on and below the body to one end of which the link is connected, a roller mounted on the truck frame against which the other end of said lever bears, a latch dog carried by said lever, a rock shaft, an arm extending from the rock shaft having an arc-shaped outer end to engage with the dog, and manually operable means for turning said rock shaft to release the arm from said latch dog.

5. A construction containing the elements in combination defined in claim 4, said latch dog being pivotally mounted to turn about the same pivotal axis as said lever, said dog having an arc-shaped slot there through, a pin from the lever extending into said slot limiting the extent of movement of the latch dog, and an adjusting screw mounted on the lever to bear against the latch dog for adjusting the same to different positions with reference to the lever.

6. In a construction of the class described, a truck frame, a body mounted thereon for tilting movement about a longitudinal horizontal axis, a side to the body pivotally mounted about an axis parallel to the axis of tilting of the body and at the lower edge of said side, a bracket on the truck frame, a roller carried by the bracket, a lever pivotally mounted between its ends on and under the truck frame having one end bearing against said roller, an arm connected to and extending downwardly from the side of the body below its pivotal axis, a link connecting the lower end of said arm with the outer end of the lever, a latch dog carried by the lever, a rock shaft, a latching arm on the rock shaft movable into and out of engagement with the dog, a transverse bar slidably mounted on the truck frame, spaced vertical guides on said bar and an arm extending from the rock shaft between said guides whereby said shaft is rocked and the latch moved into or out of operative engagement with said dog on longitudinal sliding movements of said bar.

7. In a construction of the class described, a truck frame, a body mounted thereon for tilting movement, a side to the body pivotally mounted about an axis parallel to the axis of tilting of the body and at the lower edge of said side, abutting means on the truck frame, a lever pivotally mounted between its ends on and under the truck frame having one end bearing against said abutting means, an arm connected to and extending downwardly from the side of the body below its pivotal axis, a link connecting the lower end of said arm with the outer end of the lever, a latch dog carried by the lever, a latching arm movable into and out of engagement with the dog, a bar slidably mounted on the truck frame, a guide on said bar and means extending from the latching arm to cooperate with said guide whereby said latching arm is rocked and moved into or out of operative engagement with said dog on sliding movements of said bar.

8. In a construction of the class described, a truck frame, a body mounted thereon for tilting movement, a side to the body pivotally mounted about an axis parallel to the axis of tilting of the body and at the lower edge of said side, abutting means on the truck frame, mechanism cooperatively associated with the side and said abutting means whereby tilting of the body permits controlled gravitational lowering of the side of the body, said mechanism including a lever, a latch dog, means for adjustably mounting the latch dog upon the said lever, a latching arm movable into and out of engagement with the dog, a bar slidably mounted on the truck frame, a guide on said bar and means extending from the latching arm to cooperate with said guide whereby said latching arm is rocked and moved into or out of operative engagement with said dog on sliding movements of said bar.

9. In a construction of the class described, a truck frame, a body mounted thereon for tilting movement, a side to the body pivotally mounted about an axis parallel to the axis of tilting of the body and at the lower edge of said side, abutting means on the truck frame, mechanism cooperatively associated with the side and said abutting means whereby tilting of the body permits controlled gravitational lowering of the side of the body, said mechanism including a lever, a latch dog carried by the lever, a rock shaft, a latching arm on the rock shaft movable into and out of engagement with the dog, a transverse bar slidably mounted on the truck frame, spaced vertical guides on said bar and an arm extending from the rock shaft between said guides whereby said shaft is rocked and the latch moved into or out of operative engagement with said dog on longitudinal sliding movements of said bar.

10. In a construction of the class described, a truck chassis, a body located above the chassis having four brackets terminating in spherical heads at their lower ends depending therefrom, said heads having unbroken center surfaces of smooth confirmation, two spaced apart at each side of the body whereby two are at the front and adjacent the rear ends of the body, concave seats for receiving said heads, and means adapted to engage against the upper sides of said heads by sliding thereover and selectively operable to lock the heads in their sockets at one side of the body and free those at the opposite side.

11. In a dumping construction of the class described, a frame, a body pivotally mounted thereon for a carrying position and for a dumping position, said body being adapted to receive material therein whereby pressure is exerted against its bottom and sides, said body having a gate movably mounted in one of its sides, means cooperatively associated with said gate and frame for maintaining the gate in closed position when the body is in its carrying position and means for rendering said first mentioned means inoperative when the body is tilted to a predetermined angle whereby the pressure exerted against the gate will cause it to open, said last mentioned means including a member pivotally mounted between its ends onto the body, said frame having a recess, one end of the member serving to lock the first mentioned means against movement and the other end of the member being received in said recess for the purpose described.

12. A construction as set forth in claim 10 in which the said concave seats are of substantially semi-spherical shape, each having an opening leading downwardly therethrough.

13. In a construction of the class described, a truck chassis, a body located above the chassis having four brackets terminating in spherical heads at their lower ends depending therefrom, said heads having unbroken outer surfaces of smooth conformation, two spaced apart at each side of the body whereby two are at the front and adjacent the rear ends of the body, concave seats for receiving said heads, means to lock either of the two front heads in their respective seats, sliding means for locking one of the rear heads in its seat, additional sliding means for locking the other one of the rear heads in its seat, a pivoted member located on the truck chassis intermediate the two sliding means, interengaging means between the pivoted member and each of the two sliding means whereby movement of the member about its pivot causes actuation of the said sliding means.

14. In a construction of the class described, a truck chassis, a body located above the chassis, four seat members carried by the chassis, each having a concaved recess in its upper side, two at each side thereof with two at the front end of the body and two adjacent the rear end of the body, brackets depending from the body at the corners thereof, spherical heads at the lower ends of said brackets received in the recess of said seat members, a locking bar located between the front heads, guides connected with said seat members through which the end portions of said locking bar pass, said locking bar at its ends and lower sides being recessed to engage against the upper surfaces of said spherical heads, said bar being of a length shorter than the distance between said heads, two rear locking bars located in alinement between the rear spherical heads and likewise recessed at their outer ends and lower sides to engage against the heads, guides on the seat members for said locking bars, and means for operating the locking bars for the purpose described.

15. In a construction of the class described, a truck frame, a body mounted on and above the truck frame for tilting movement to a side thereof about a horizontal axis located adjacent said side of the truck frame, a vertical side on said body pivotally mounted thereon at its lower edge lengthwise of the body, a vertical arm connected to said side having a part at its lower end extending below the pivotal axis of the side, a link pivotally connected to the lower end of the arm, a lever pivotally mounted between its ends on and below the body to one end of which the link is connected, means mounted on the truck frame against which the other end of said lever bears, a latch dog carried by said lever, a rock shaft, an arm extending from the rock shaft having an outer end to engage with the dog, and manually operable means for turning said rock shaft to release the arm from said latch dog.

EDWARD R. BARRETT.